(12) United States Patent
Mosko et al.

(10) Patent No.: US 10,098,051 B2
(45) Date of Patent: Oct. 9, 2018

(54) GATEWAYS AND ROUTING IN SOFTWARE-DEFINED MANETS

(71) Applicant: CISCO TECHNOLOGY, INC., San Jose, CA (US)

(72) Inventors: Marc E. Mosko, Santa Cruz, CA (US); Jose J. Garcia-Luna-Aceves, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 14/161,410

(22) Filed: Jan. 22, 2014

(65) Prior Publication Data
US 2015/0208316 A1    Jul. 23, 2015

(51) Int. Cl.
*H04W 40/02*    (2009.01)
*H04W 28/10*    (2009.01)
(Continued)

(52) U.S. Cl.
CPC ............. *H04W 40/02* (2013.01); *H04L 45/02* (2013.01); *H04L 45/64* (2013.01); *H04W 28/10* (2013.01);
(Continued)

(58) Field of Classification Search
CPC ..... H04W 40/02; H04W 28/10; H04W 40/24; H04W 40/26; H04W 84/18; H04W 40/04;
(Continued)

(56) References Cited

U.S. PATENT DOCUMENTS 817,441 A    4/1906 Niesz
4,309,569 A    1/1982 Merkle
(Continued)

FOREIGN PATENT DOCUMENTS

CN    103873371    6/2014
DE    1720277 A1    6/1967
(Continued)

OTHER PUBLICATIONS

J. Lotspiech, S. Nusser, and F. Pestoni. Anonymous Trust: Digital Rights Management using Broadcast Encryption. Proceedings of the IEEE 92.6 (2004).
(Continued)

*Primary Examiner* — Kwang B Yao
*Assistant Examiner* — Hardikkumar Patel

(57) ABSTRACT

One embodiment provides a mobile wireless network that includes a plurality of wireless nodes and a controller node which manages a weighted network graph for the plurality of wireless nodes. A local wireless node sends a route-request message associated with at least one destination node to the controller node, receives a path to the destination node, and routes a packet to the destination node based on the received path. The path is computed based on the weighted network graph. One embodiment provides a system for routing in a mobile wireless network that comprises a plurality of wireless nodes. The system receives a route-request message associated with at least one destination node from a source node, computes a path between the source node and the destination node based on a weighted network graph for the plurality of wireless nodes, and transmits the computed path to at least the destination node.

20 Claims, 13 Drawing Sheets

(51) Int. Cl.
   *H04L 12/715* (2013.01)
   *H04W 40/24* (2009.01)
   *H04L 12/751* (2013.01)
   *H04L 12/717* (2013.01)
   *H04L 12/761* (2013.01)

(52) U.S. Cl.
   CPC .............. *H04W 40/24* (2013.01); *H04L 45/16* (2013.01); *H04L 45/42* (2013.01)

(58) Field of Classification Search
   CPC ....... H04W 40/14; H04W 4/00; H04W 48/08; H04L 45/02; H04L 45/64; H04L 45/16; H04L 45/42; H04L 12/26; H04L 45/121; H04L 12/56; H04L 12/18; H04L 45/12; H04L 12/1868
   See application file for complete search history.

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,970,464 B2 * | 11/2005 | Xu .......................... H04L 12/24 370/392 |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 * | 7/2009 | Elliott .................. H04W 48/08 370/329 |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |

(56) References Cited

U.S. PATENT DOCUMENTS

| | | |
|---|---|---|
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |

(56) References Cited

U.S. PATENT DOCUMENTS

| | | |
|---|---|---|
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1* | 5/2009 | Hughes ............... H04L 45/122 370/238 |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1* | 12/2009 | Maier ............... H04L 45/12 370/400 |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1* | 6/2011 | Hwang ............... H04W 40/26 370/328 |
| 2011/0153840 A1 | 6/2011 | Narayana |
| 2011/0158122 A1* | 6/2011 | Murphy ............... H04L 45/121 370/252 |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1* | 5/2012 | Ko ............... H04L 12/18 370/390 |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |

(56) References Cited

U.S. PATENT DOCUMENTS

| | | |
|---|---|---|
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0320768 A1* | 12/2012 | Shaffer ............... H04W 40/16 370/252 |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1* | 9/2014 | Luo ...................... H04W 40/22 370/392 |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |

(56) References Cited

U.S. PATENT DOCUMENTS

| | | | |
|---|---|---|---|
| 2016/0110466 | A1 | 4/2016 | Uzun |
| 2016/0171184 | A1 | 6/2016 | Solis |

FOREIGN PATENT DOCUMENTS

| | | | |
|---|---|---|---|
| DE | 19620817 | A1 | 11/1997 |
| EP | 0295727 | A2 | 12/1988 |
| EP | 0757065 | A2 | 7/1996 |
| EP | 1077422 | A2 | 2/2001 |
| EP | 1383265 | A1 | 1/2004 |
| EP | 1384729 | A1 | 1/2004 |
| EP | 1473889 | A2 | 11/2004 |
| EP | 2120402 | | 11/2009 |
| EP | 2120419 | | 11/2009 |
| EP | 2120419 | A2 | 11/2009 |
| EP | 2124415 | A2 | 11/2009 |
| EP | 2214357 | A1 | 8/2010 |
| EP | 2299754 | A1 | 3/2011 |
| EP | 2323346 | | 5/2011 |
| EP | 2552083 | | 1/2013 |
| EP | 2214356 | | 5/2016 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2007113180 | A1 | 10/2007 |
| WO | 2007122620 | | 11/2007 |
| WO | 2007144388 | A1 | 12/2007 |
| WO | 2011049890 | A1 | 4/2011 |
| WO | 2012077073 | A1 | 6/2012 |
| WO | 2013123410 | | 8/2013 |
| WO | 2015084327 | | 6/2015 |

OTHER PUBLICATIONS

RTMP (2009). Available online at http://wwwimages.adobe.com/www.adobe.com/content/dam/Adobe/en/devnet/rtmp/ pdf/rtmp specification 1.0.pdf.

S. Kamara and K. Lauter. Cryptographic Cloud Storage. Financial Cryptography and Data Security. Springer Berlin Heidelberg (2010).

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (Pursuit)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

B. Lynn. The Pairing-Based Cryptography Library, http://crypto.stanford.edu/pbc/.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (Infocom Wkshps), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—Asiacrypt 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' Infocom 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

(56) References Cited

OTHER PUBLICATIONS

Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boner, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks,' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Symposium (2005).
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

(56) References Cited

OTHER PUBLICATIONS

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).

(56) References Cited

OTHER PUBLICATIONS

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
European Office Action in counterpart European Application No. 15151557.4, dated Dec. 13, 2016, 8 pages.
Boukerche, et al., "5.4 Ad Hoc Networks Routing Protocols," Algorithms and Protocols for Wireless and Mobile Ad Hoc Network, Chapter 5—A Taxonomy of Routing Protocols for Mobile Ad Hoc Networks, Nov. 2008, pp. 132-158.
Extended European Search Report in counterpart European Application No. 15151557.4, dated May 6, 2015, 7 pages.

* cited by examiner

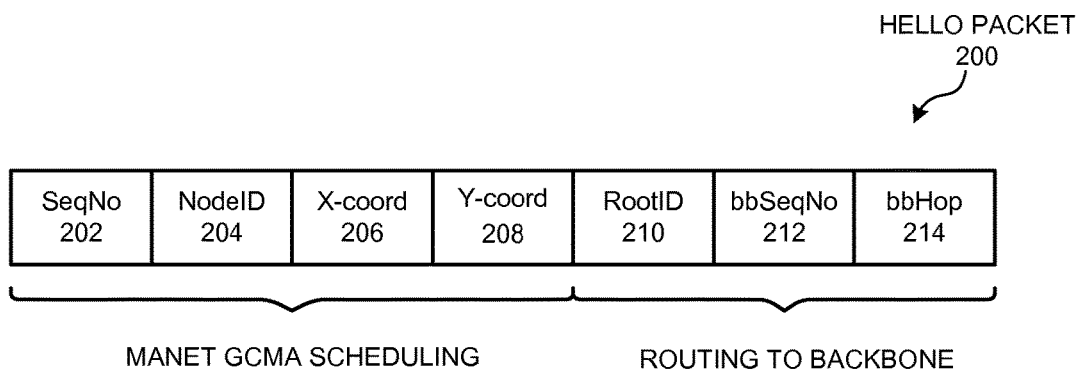

HELLO PACKET 200

| SeqNo 202 | NodeID 204 | X-coord 206 | Y-coord 208 | RootID 210 | bbSeqNo 212 | bbHop 214 |

MANET GCMA SCHEDULING ROUTING TO BACKBONE

FIG. 2

1: Let $OHN_i$ denote one-hop-neighborhood of node i
2: Let $BBSeqNo$ be the sequence number of the latest backbone update
3: Let $root$ be the root node ID of the tree connected to the backbone
4: Let $bbHop$ be the number of hops from node to the root node
5: Let $bbSeqNo$ be the sequence number at the node
6: Let $nextHopToBB$ be the next hop node to the backbone
7: if node i is connected by one hop to the backbone then
8:     $root \leftarrow i$
9:     $bbSeqNo \leftarrow BBSeqNo$
10:     $bbHop \leftarrow 1$
11:     $nextHopToBB \leftarrow NULL$
12: else
13:     for all n in $OHN_k$ do
14:         if $seqNo < n.bbSeqNo$ then
15:             $root \leftarrow n.root$
16:             $bbSeqNo \leftarrow n.bbSeqNo$
17:             $bbHop \leftarrow n.bbHop + 1$
18:             $nextHopToBB \leftarrow n$
19:         else if $bbSeqNo == n.bbSeqNo$ then
20:             if $bbHop > n.bbHop + 1$ then
21:                 $root \leftarrow n.root$
22:                 $bbSeqNo \leftarrow n.bbSeqNo$
23:                 $bbHop \leftarrow n.bbHop + 1$
24:                 $nextHopToBB \leftarrow n$
25:             end if
26:         end if
27:     end for
28: end if

FIG. 3

GATEWAYS AND ROUTING IN SOFTWARE-DEFINED MANETS

STATEMENT OF GOVERNMENT-FUNDED RESEARCH

This invention was made with U.S. government support under Contract No. FA8750-12-C-0246(3743) awarded by the Advanced Research Projects Agency (ARPA). The U.S. government has certain rights in this invention.

BACKGROUND

Field

This disclosure is generally related to mobile ad-hoc networks (MANETs). More specifically, this disclosure is related to a software-defined MANET based on an intelligent backbone infrastructure.

Related Art

Typical ad-hoc communication systems oftentimes require independent mobile users that can communicate in a non-centralized and self-organized fashion. For example, mobile ad-hoc networks (MANETs) employ peer-to-peer a communication protocol to determine a path between two wireless nodes. Some key characteristics of MANETs include their ability to adapt to route changes due to mobility and the fact that they have no requirement for base stations or access points for node organization.

In theory, a MANET provides an ideal communication infrastructure to support disaster-relief and battlefield operations, emergency search and rescue missions, and many other mobile and distributed applications. However, these applications cannot be supported effectively in today's networks. This is mainly because the networks don't scale due to the excessive signaling incurred with an increasing number of nodes and applications. More specifically, MANET protocols distribute calculations (such as routing information) over many nodes hop-by-hop. To ensure protocol correctness and efficient operation, such as to avoid loops and excessive flooding, complex distributed algorithms are needed.

On the other hand, cellular systems use centralized resources (such as a set of networked cell towers) to service large areas, usually at much lower data rates than a MANET could achieve to nearby neighbors. However, compared to the distributed system, this centralized system allows much simpler routing and protocol operations due to the centralized nature of the system.

The centralized nature can also be seen in software-defined networking (SDN), such as the one based on the OpenFlow protocol. In SDN, the "control plane" and the "data plane" are separated, and at least two control routers are used to instantiate state on the controlled network elements. With SDN, the topology of the network is virtualized at the controller nodes, which compute routes from sources to destinations according to a network-wide view, and can instantiate the "flow-state" at each switch of the network. Unfortunately, current SDN implementations compute paths based on the network's flow-states, and thus cannot be applied to MANETs.

SUMMARY

One embodiment provides a mobile wireless network that includes a plurality of wireless nodes and a controller node which manages a weighted network graph for the plurality of wireless nodes. During operation, a local wireless node sends a route-request message associated with at least one destination node to the controller node, receives a path to the destination node, and routes a packet to the destination node based on the received path. The path is computed based on the weighted network graph.

In a variation on this embodiment, the local wireless node receives the path from a next-hop node to the destination node. The path was transmitted by the controller node via the destination node to establish a route to the local wireless node.

In a variation on this embodiment, the local wireless node receives the path from the controller node, and routes the packet to the destination node by performing source-route to the destination node based on the received path.

In a variation on this embodiment, the local wireless node sends the route-request message to the controller node by: determining whether the local wireless node has an access to the controller node; and in response to the access not existing, sending the route-request message associated with the destination node to a peer network node that has an access to the controller node.

In a variation on this embodiment, the local wireless node further sends to the controller node a status update associated with the local wireless node.

In a further variation, the status update includes neighborhood metrics associated with the local wireless node. The neighborhood metrics include a list of neighbor nodes and connectivity metrics for each neighbor node, and the connectivity metrics include one or more of: a channel reliability, a residual bandwidth, and a queueing latency.

In a further variation, the status update further includes one or more of: a list of multicast groups to which the local wireless node is subscribed, and names of resource objects stored by the local wireless node.

One embodiment provides a system for routing in a mobile wireless network that comprises a plurality of wireless nodes. During operation, the system receives a route-request message associated with at least one destination node from a source node, computes a path between the source node and the destination node based on a weighted network graph for the plurality of wireless nodes, and transmits the computed path to at least the destination node.

In a variation on this embodiment, the system computes the weighted network graph based on neighborhood metrics received from the plurality of wireless nodes.

In a further variation, the system computes the weighted network graph by computing a cost function for each link within the wireless network based on the neighborhood metrics.

In a variation on this embodiment, the system selects a multicast core for a multicast group based on the weighted network graph, and computes best routes to the multicast core for each node within the multicast group.

In a variation on this embodiment, the system selects a gateway node within the wireless network, and schedules transmissions of the gateway node to enable the gateway node to communicate with nodes within a second wireless network operating at a different wireless channel. Scheduling the transmissions of the gateway node involves reserving one or more transmission opportunities for the gateway node to communicate with the second wireless network.

BRIEF DESCRIPTION OF THE FIGURES

FIG. 2 presents a diagram illustrating an exemplary frame format of a "Hello" packet sent from a node to its neighbor, in accordance with an embodiment of the present invention.

FIG. 3 presents an exemplary pseudocode for updating the next-hop node, in accordance with an embodiment of the present invention.

In the figures, like reference numerals refer to the same figure elements.

DETAILED DESCRIPTION

Figure 1:
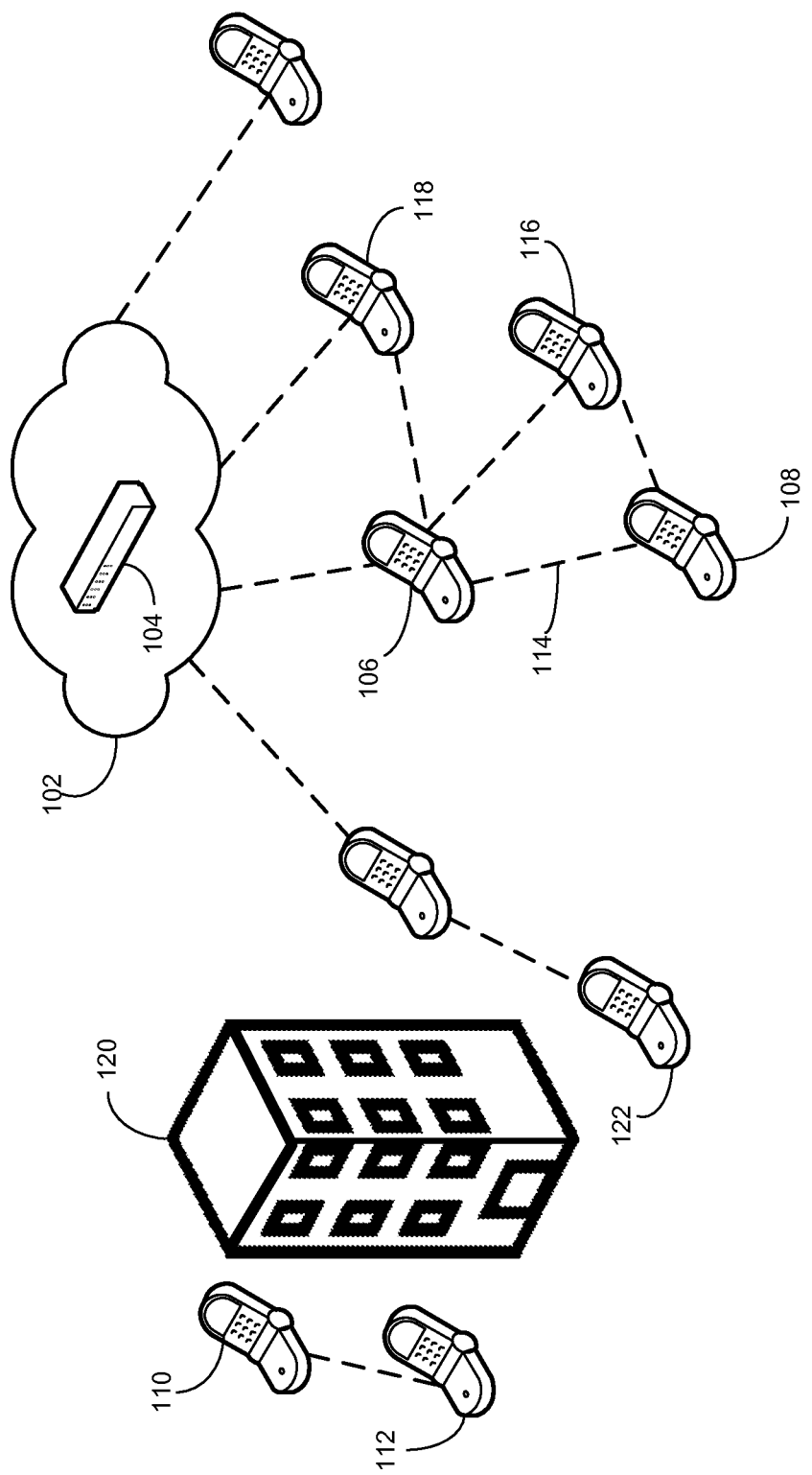
FIG. 1 presents a diagram illustrating an exemplary software-defined MANET (SDM), in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for a software-defined MANET that solves the scalability problem of currently existing MANETs. More specifically, the system includes a centralized backbone service which maintains a weighted graph of a wireless network, and can compute shared multicast trees based on changes in the weighted graph. The wireless network includes a number of mobile nodes that can send status updates to the backbone service, for example, to report the link quality to each one-hop neighbor. The centralized backbone service can update the weighted graph based on the status updates, and the mobile nodes can request an optimized routing path from the centralized backbone service. If a mobile node does not have a path to the backbone service, this mobile node can send a routing request or status update to its connected peer nodes to obtain peer-to-peer routing.

In some embodiments, routing within the wireless network is achieved based on Interest-defined mesh enclaves. A mesh includes a set of connected components of a MANET for unicast and multicast flows associated with a specific piece of data or service. The backbone service can activate or deactivate a mesh based on the presence or absence of interest in a destination or a service, and confines most of the signaling overhead within each region of interest (enclave). Here, the term "interest" generally refers to data traffic for a specific piece of data or a service. Also, under the context of information-centric networking (ICN), the term "Interest" or "Interest packet" refers to a packet that indicates a request for a piece of data by including a name (or name prefix) for the data. A data consumer can disseminate an interest packet across a named-data network, which ICN routers can propagate toward a storage device (e.g., a cache server) or a data producer that can provide a matching content object to satisfy the interest packet.

In some embodiments, the system can use flow-specific routing to enable QoS (quality of service). For example, the backbone service can collect neighborhood information reported by a set of wireless nodes, such as a channel reliability, a residual bandwidth, and a queueing latency. The backbone service can use the neighborhood information to determine an optimal route to the destination for a given flow.

The backbone service can also facilitate communication across two or more MANETs. Each MANET can include one or more nodes that act as gateways between two MANETs operating on different peer-to-peer channels, such as via different frequencies and/or different time slots for a given frequency. The backbone service can reserve time slots or airtime on the foreign MANET to ensure contention-free inter-MANET routing.

Network Architecture

The protocol stacks used in today's wireless networks are inherently based on peer-to-peer signaling and are designed to operate with limited information. In these existing protocols, the control and data planes do not take into account much of the context within which user data are disseminated, and each packet specifies its own context in its headers; backbones are exploited only at the link level within the context of hierarchical network architectures used to cope with size.

SDN provides a simplified network operation that reduces peer-to-peer signaling, and reduces signaling from switches by configuring switches to only transmit updated neighborhood information to the controller. SDN also provides a backbone service that simplifies the configuration and management of the network, for example, based on neighborhood information from various wireless nodes. However, a typical SDN does not directly address scalability issues facing MANETs, because current SDN implementations are focused on wired network topologies operating in server rooms, where the controller is one link away from every switch and the signaling is performed solely on the network layer. In other words, typical SDN implementations do not facilitate dynamic placement of content and services.

Information-centric networking (ICN) has recently attracted much research attention. ICN implementations consist of publish-subscribe schemes in which content objects have names (e.g., a hierarchical or flat name), and routing nodes can cache content objects to handle future requests locally. Each request that states an Interest in a specific piece of content is diffused in a way similar to route requests, and the nearest sites with copies of the requested content answer the requests. ICN implementations can dynamically adapt a network to the needs of an application by providing content and services to the application from the sites closest to the application.

However, limitations in typical ICN implementations do not allow a network to scale toward large-scale dynamic networks. First, these ICN implementations route packets on the basis of object names, which incurs excessive signaling overhead between network peers and requires an undesirably large computation overhead at each routing node. The signaling and computation overhead increases as the number of information objects requested by applications becomes far larger than the number of network nodes. Second, ICN implementations utilize routing nodes as caching nodes, which causes relaying nodes to incur an additional computation overhead to evaluate content requests (e.g., Interest packets) to determine whether the requested content is stored locally.

Some embodiments of the present invention provide a software-defined MANET (SDM), which uses the network backbone as a service. SDM integrates SDN, ICN, and utility-based cross-layering (including the integrating of routing states, channel states, and MAC (media access control) states) to implement very large-scale dynamic networks, without using predefined clustering or artificial network bounds.

FIG. 1 presents a diagram illustrating an exemplary software-defined MANET (SDM), in accordance with an embodiment of the present invention. SDM 100 can include a backbone cloud 102 (which is hereinafter referred to as backbone 102) and a set of mobile network nodes. More specifically, backbone 102 can include one or more controller nodes, such as a controller node 104, which communicate with each other via a wired or wireless network. At least some of the mobile nodes can communicate with backbone 102 over a wireless network, either directly or via a multi-hop path. For example, mobile node 106 is coupled to backbone 102 via a one-hop link, whereas mobile node 108 is coupled to backbone 102 via a two-hop link through node 106. Also, some the mobile nodes may not detect a path to backbone cloud 102. For example, mobile nodes 110 and 112 may not detect a path to backbone 102 when a large physical barrier 120 obstructs the communication channel to any device with a path to backbone 102. However, mobile modes 110 and 112 may detect a network path to each other, and can communicate with each other via a default peer-to-peer routing protocol. In FIG. 1, the dashed lines indicate wireless links.

During operation, the mobile nodes that have a path to backbone 102 can monitor their neighborhood environment to periodically report local information and this neighborhood information to backbone 102. The neighborhood information reported by the mobile nodes to backbone 102 includes neighborhood metrics (e.g., a link quality to each one-hop neighbor based on received signals), and a set of multicast addresses used by the node. The local information can include a geographic location (e.g., global positioning system (GPS) coordinates) for the local node, and a change in the content cached by the local node.

The neighborhood metrics can include a list of neighbor nodes detected by the local node, along with the connectivity metrics for each neighbor. The connectivity metrics for each neighbor can be gathered by a node at the MAC (media access control) layer. In some embodiments, the connectivity metrics for each neighbor include, but are not limited to: a channel identifier, a channel reliability metric, a residual bandwidth metric, and a queueing latency. The channel reliability metric can be computed by the signal-to-interference-plus-noise ratio (SINR), or by the rate of successful packet delivery.

In some embodiments, a network node measures the channel reliability of a link to its neighbor node by calculating the ratio of "Hello" packets (which we will describe in more detail later) received clearly at the local node to the total "Hello" packets sent by the neighboring node (as determined based on a sequence number attached to the "Hello" packets). In a further embodiment, the channel reliability is computed based on a packet success ratio calculated for both the uplink and downlink directions. The network node can compute the channel reliability metric by computing a product of the uplink packet success ratio and the downlink packet success ratio. The residual bandwidth metric for a link to a neighboring node is computed from the amount of bandwidth available across the link, and is calculated from the free timeslots available in a set of scheduled time slots. The node computes the queueing latency from the average time that packets spend in the MAC queue before they are transmitted. Backbone 102 uses these neighborhood metrics to determine the best routes to the destination node for a given flow.

The multicast-groups information indicates the multicast groups (as expressed in MAC IDs) that the network node has subscribed to at a given point in time. Backbone 102 can use multicast information to create and maintain the proactive multicast trees.

Each mobile node across network 100 can send the content-deltas information to backbone 102 to inform backbone 102 on changes in the content items cached by the network node. Sending content-deltas information to backbone 102 avoids redundant signaling, by omitting the names of content objects that backbone 102 is already aware to be cached by the network node. Note that sending content deltas to the backbone is equivalent to "publish" messages in ICN architectures.

Mobile nodes that do not have a path to backbone cloud 102, such as mobile nodes 110 and 112, do not report or update their local or neighborhood information to backbone 102. These nodes rely on a default peer-to-peer routing protocol where network nodes report or update their information directly to their neighbor nodes.

Note that, in conventional MANETs, the routing operations (unicast or multicast) is performed in a peer-to-peer manner, which can be inefficient and limits the network scalability. In contrast, in the example shown in FIG. 1, backbone 102 provides a centralized backbone service to a set of mobile nodes. The backbone service relieves most routing overhead from the MANET (which includes the mobile nodes) by using node information reported to backbone 102 to generate optimal unicast routes, and to compute shared multicast trees per multicast group.

In some embodiments, backbone 102 creates and manages a weighted graph of network 100 using a cost function that incorporates link reliability, queueing delays, scheduling delays, and residual bandwidth information obtained from mobile nodes of MANET 100. The backbone service can dynamically update the weighted graph each time backbone 102 receives information that indicates a change in MANET 100 (such as when a mobile node moves or changes its state). The cost function captures the estimates a latency that may be incurred by using a link between two MANET nodes as a relay for data traffic. The cost function can be computed in various ways, depending on the underlying MAC protocol. For example, for a Wi-Fi network, the cost function considers the channel congestion and backoff experienced due to network contention over the MAC layer. For a scheduling-based MAC, the cost function considers the scheduling delay between transmission time slots and the cost of lost packets. In some embodiments, the backbone service computes the cost function as:

$$\text{cost} = [(queueTime + packetTime) \times \text{penalty}] \times \frac{1}{\text{reliability}}. \quad (1)$$

In equation (1), queueTime is the average queueing delay for the neighbor's channel measured in microseconds, and packetTime is the time to transmit a 128 byte packet on the channel, also in microseconds. In some embodiments, packetTime is assumed to be no less than 1 microsecond. Penalty is a cost penalty incurred as the residual bandwidth approaches 0 (i.e., the node is using a high percentage of its available scheduled airtime). The factor 1/reliability increases as a link's reliability decreases to penalize unreliable neighbors that require a large number of transmission attempts for a successful packet reception. In some embodiments, the backbone service can compute the cost using the bi-directional link reliability given that the backbone service knows the two one-way reliability of a link based on information reported by each MANET node across the link. The backbone service can use the weighted graph, whose weighted values are dynamically updated using the cost function, to perform on-demand routing while accounting for real-time changes to MANET 100.

Protocols and Algorithm

Conventional MANETs often rely on running a unicast and a multicast protocol in parallel to support both point-to-point and many-to-many communication, and thus, is inefficient in bandwidth utilization. Moreover, existing on-demand unicast or multicast protocols often result in the network being flooded frequently with link-state updates, distance updates, route requests, or multicast updates. To solve these problems, embodiments of the present invention use an interest-based routing protocol that can be used to implement unicast and multicast routing. More specifically, this interest-based protocol establishes meshes that are activated and deactivated by the presence or absence of interest in individual destination nodes and groups, and confines most of the signaling overhead within regions of interest (enclaves) in such meshes. It has been shown that routes established in the interest-based protocol are free of permanent loops, and this protocol is more scalable than traditional multicast and unicast routing protocols.

The interest-based routing protocol establishes and maintains a routing mesh for each active multicast group (i.e., for each group with active sources and receivers) and for each unicast destination with at least one active source. The first source that becomes active for a given unicast or multicast destination sends its first data packet included in a mesh request (MR) that is flooded to peer mobile devices across a MANET up to a horizon threshold (which defines the scope of the dissemination of the MR). If the interest expressed by the source spans more than the single data packet, the intended receiver(s) of an MR establish and maintain a routing mesh spanning the active sources and the destination. The destination may be a single node if the destination is unicast, or may be a dynamic set of nodes if the destination is multicast.

For a multicast flow, the receivers of the multicast group run a distributed election using mesh announcements (MAs) to elect a core for the group. Once elected, the core node is the only receiver that continues to generate MAs for the group. In some embodiments, when the backbone service is available, the backbone service proactively computes the shared multicast trees for each multicast group (e.g., in response to receiving updated information from a mobile node), and sends this information to the multicast group members so they always have the multicast groups' setup. In some embodiments, the backbone service dynamically elects a tree core for each multicast tree based on the core's centrality within the weighted network graph. No such election is needed for a unicast destination. An elected multicast core or unicast destination continues sending MAs with monotonically increasing sequence numbers for as long as there is at least one active source interested in it. When there is no active source detected in a flow, the destination or core of the flow stops generating MAs after a finite time, which causes the backbone and the associated mobile nodes to delete the routing information corresponding to the mesh of the flow. To confine control traffic to those portions of the network that need the information, the routing protocol defines an enclave (or region of interest) for an established mesh. Note that establishment of such an enclave involves both the backbone and the mobile nodes. The enclave is a connected component of the network, and spans all the receivers that can include the destination, the interested active sources, and the relay nodes needed to connect them.

Various MAC protocols can be used in the SDM. In some embodiments, nodes within the SDM communicate with each other using a MAC protocol derived from GCMA (Geographical Classification Multiple Access). Other possible protocols can include a context-aware protocol engine (CAPE), which relies on context-aware packet switching to disseminate information. In some embodiments, the backbone can implement GCMA to define collision-free transmission schedules using deterministic distributed algorithms based on the geo-spatial coordinates of nodes, together with their transmission and interference ranges. These algorithms require each node to know only the geo-spatial coordinates (which can be obtained from the GPS data for each node) of its immediate neighbors to derive correct transmission schedules, even in the presence of hidden terminals. The transmission frames in GCMA consist of the minimum number of time slots needed to avoid multiple access interference, given the transmission and interference ranges of the nodes.

Within a MANET, neighboring nodes can share a common channel. The channel is partitioned into a set of transmission frames, and each node is mapped into slots within the frames based on its 'x' and 'y' geographical coordinates and its slot number value. A mobile node can use a time slot to transmit one or more data packets. In some embodiments, a mobile node can use a time slot to transmit a "Hello" packet as a way to detect a set of next-hop nodes, for example, to find a next-hop node along a path to the backbone.

FIG. 2 presents a diagram illustrating a frame format of an exemplary "Hello" packet 200 sent from a node to its neighbor, in accordance with an embodiment of the present invention. "Hello" packet 200 can include a set of fields, some of which can be used for GCMA scheduling. For example, "Hello" packet 200 can include a sequence number (SeqNo) field 202, a node ID field 204, an X-coordinate (X-coord) field 206, and a Y-coordinate (Y-coord) field 208. In addition, "Hello" packet 200 can include a set of fields that can be used to find the next-hop node along a path to the backbone. These set of fields can include, for example, a root ID field 210 that indicates the root of the tree connected to the backbone, a bbSeqNo field 212 that indicates the sequence number at the node, and a bbHop field 214 that indicates the number of hops from the node to the root node.

During operation, each node periodically (e.g., after every HelloInterval seconds) sends "Hello" packets to its neighbor nodes, and maintains a list of one-hop neighbors along with the data fields reported by each neighbor in its "Hello" packet.

In addition to GCMA-based scheduling, in some embodiments, a priority-based queueing system is used to handle signaling traffic, elastic data flows, and real-time flows. When a node is allowed to transmit over a time slot, the node transmits as many packets as possible during the time slot, for example, by selecting packets from its local transmission queues using a strict priority scheduler. In some embodiments, a node's queues are FIFO (first-in, first-out), and are served using a priority-based algorithm.

In some embodiments, a mobile node can include more than one queue. For example, a gateway node may have time slots for two or more channels, each of which corresponds to a different flow. If a node has more than one nonempty queue with the highest priory, the node can iterate between these queues in a round-robin fashion. For example, network-layer signaling packets can have the highest priority ($p_{ctr}$), followed by data packets waiting in data queues. Data queues can be either elastic or real-time, and real-time queues are assigned higher priority ($p_{RT}$) than the priority given to elastic queues ($p_{elastic}$), given that jitter and latencies are not as important for elastic queues. A mobile node can transmit "Hello" packets with the lowest priority ($p_{Hello-}$) if fewer than HelloInterval seconds have elapsed since the last time a "Hello" packet was transmitted. However, if more than HelloInterval seconds have elapsed, then the mobile node can refresh the neighborhood information; hence, the mobile node sets the priority of the "Hello" packet to $p_{Hello+} > p_{ctr}$. Overall, during a time slot allocated to a node, the relationship among traffic priorities is:

$$p_{Hello-} < p_{elastic} < p_{RT} < p_{ctr} < p_{Hello+}.$$

As described previously, mobile nodes can use information included in a "Hello" packet to find a valid next-hop node toward the backbone. This allows a mobile node to send update information to the backbone via its next-hop node. In the example shown in FIG. 1, mobile node 108 can identify mobile node 106 as its next-hop node to the backbone. Consequently, mobile node 108 can send its backbone update to mobile node 106, which forwards the update to backbone 102 and stores the state information.

In some embodiments, a mobile node uses a simple version of distance vector routing algorithm to find the next-hop node to the backbone. More specifically, the mobile node can use the sequence number and root value of the "Hello" packets (as shown in FIG. 2) received from each of its one-hop neighbors to determine a distance of each neighboring node. The algorithm guarantees loop freedom in the routes from each node in the network to the backbone. FIG. 3 presents an exemplary pseudocode for updating the next-hop node, in accordance with an embodiment of the present invention. Specifically, when a mobile node receives a new "Hello" message, the node executes the algorithm shown in FIG. 3 to update its next-hop node ID.

Figure 4:
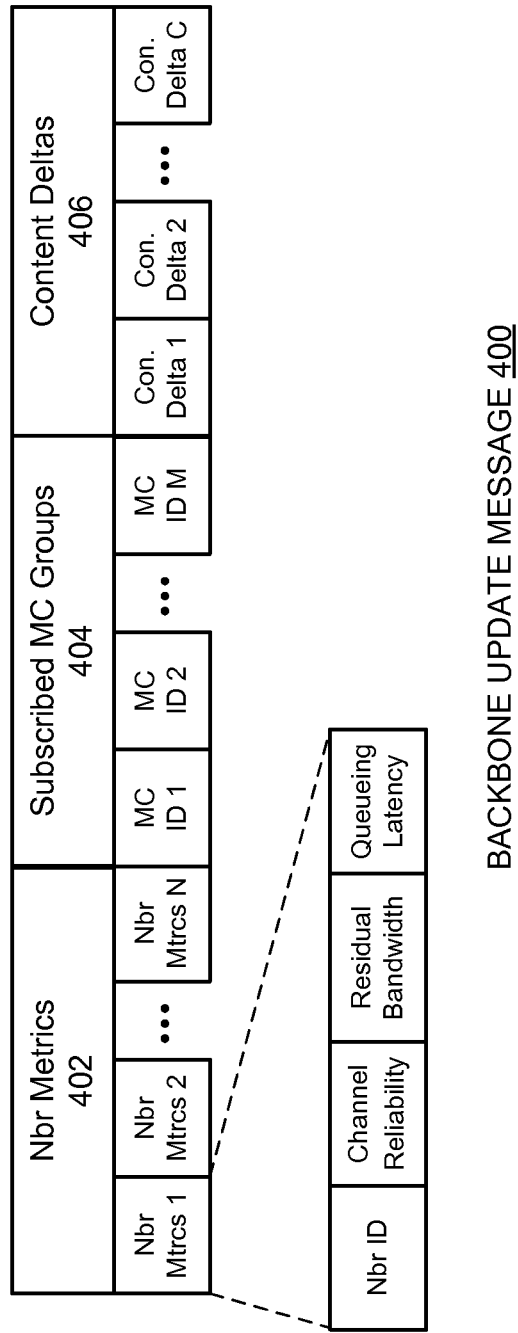
FIG. 4 presents a diagram illustrating an exemplary update message sent by a mobile node to the backbone, in accordance with an embodiment of the present invention.

Note that the mobile nodes communicate with the backbone using a channel that is different from the channel used for peer-to-peer communication. In some embodiments, a TDMA scheme is used to distinguish between the two channels. Each node having a path to the backbone sends periodic updates to the backbone. FIG. 4 presents a diagram illustrating an exemplary update message sent by a mobile node to the backbone, in accordance with an embodiment of the present invention.

In FIG. 4, backbone update message 400 includes three data blocks, a neighborhood-metrics (Nbr Metrics) block 402, a subscribed-multicast (MC)-groups blocks 404, and a content-deltas block 406. Neighborhood-metrics block 402 includes a list of neighborhood nodes (listed as Nbr ID) and the connectivity metrics (including channel reliability, residual bandwidth, and queueing latency) for each neighborhood node. Subscribed-MC-groups block 404 lists the multicast group ID of the multicast groups to which the node has subscribed. Content-deltas block 406 lists the names of the content objects the node has recently stored in its local cache. The backbone service can use information from backbone update message 400 to determine the best routes to the destination for a given flow, and to provide QoS support. The backbone service can also perform QoS-based routing, based on up-to-date information about link status, such as reliability, delay, and bandwidth. For example, while computing paths, a link that does not meet a mobile node's QoS requirement would be considered inactive.

In addition, if the backbone service receives updated neighborhood metrics after determining and sending routes to mobile nodes in the network, the backbone service can generate and send reactive updates to the mobile nodes to change the data flow path based on the updated metrics. For example, once a mobile node detects a new neighbor, the mobile node updates the backbone with its new neighborhood metrics, which the backbone service then uses to compute an updated route. For multicast traffic, the backbone service also sends proactive updates to mobile nodes to maintain the core-based multicast trees.

Unicast and Multicast Routing

For unicast traffic, when a node has packets to send to a destination, it sends a RouteRequest packet to the backbone. In some embodiments, the RouteRequest packet includes the address of the destination, or includes an "Interest" to a piece of content. The backbone computes paths on-demand based on the weighted network graph, and sends the least-cost path to the destination node in a RouteReply packet. Note that, instead of finding a path with a fewest number of hops to the destination, the backbone can select an optimal path based on the link quality between hops. In the example shown in FIG. 1, if the link quality between nodes 106 and 108 is not satisfactory (due to signal interference or physical barriers), backbone cloud 102 may route traffic from node 106 to node 108 via node 116 instead of routing traffic directly from node 106 to node 108 via link 114. In some embodiments, the backbone service uses Dijkstra's algorithm to compute a path.

Upon receiving the RouteReply packet, the destination node sends MeshReply packets to establish the route. However, the destination node does not flood the MeshReply packets through the network. Rather, the destination node can perform source-routing using the path in the RouteReply packet to establish a route to the source node.

Figure 5:
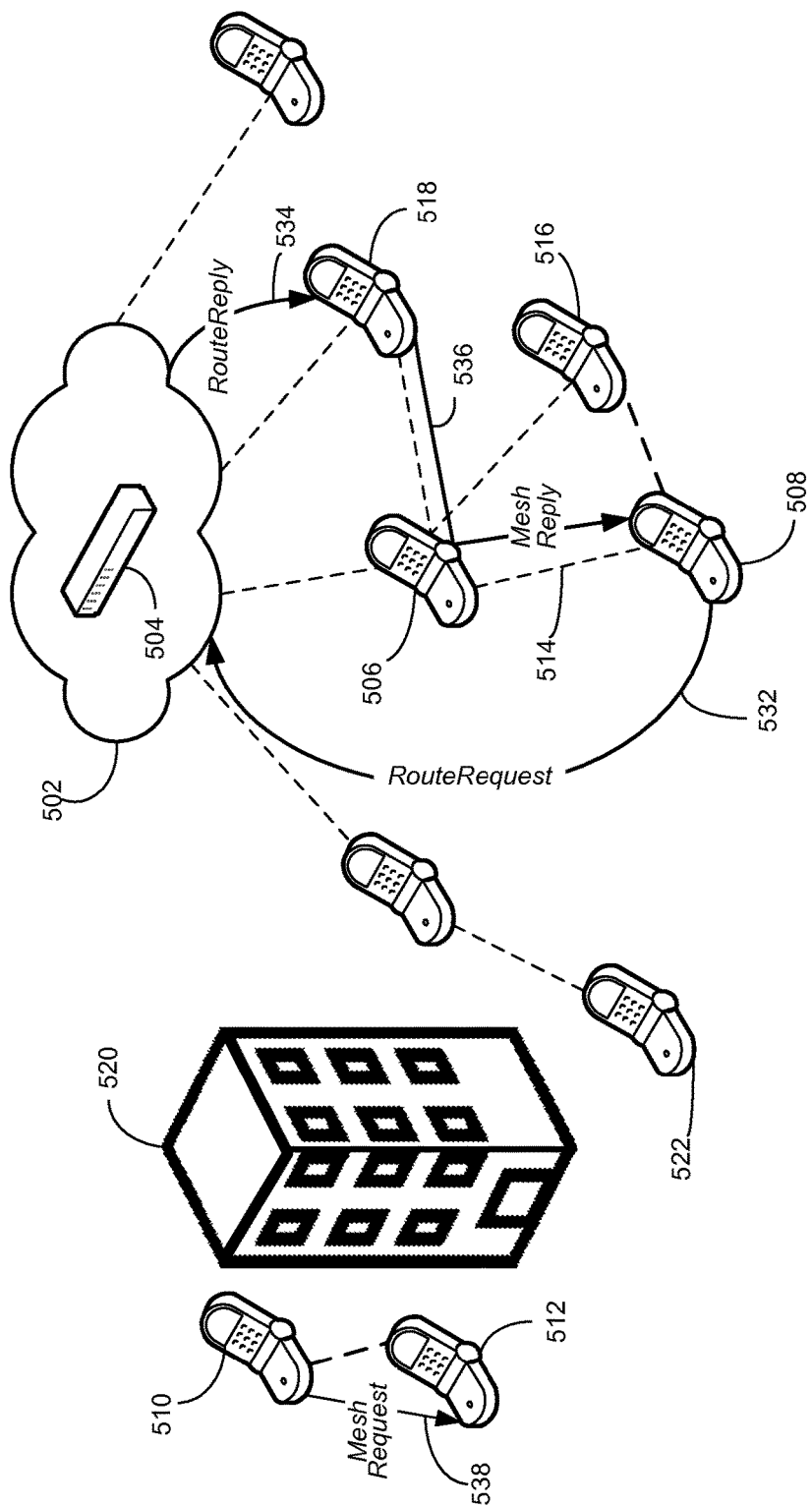
FIG. 5 presents a diagram illustrating a unicast routing process, in accordance with an embodiment of the present invention.

FIG. 5 presents a diagram illustrating a unicast routing process, in accordance with an embodiment of the present invention. In the example shown in FIG. 5, if mobile node 508 intends to obtain content objects or services from node 518, mobile node 508 can send a RouteRequest packet to backbone 502 as indicated by an arrow 532, which identifies mobile node 518 as the destination node based on the content updates sent from mobile node 518, and computes a path between mobile nodes 508 and 518 (for example, node 508-node 506-node 518). Backbone 502 then sends a RouteReply packet to mobile node 518 as indicated by an arrow 534. The RouteReply packet includes the computed path.

Upon receiving the RouteReply packet, mobile node 518 sends one or more MeshReply packets back to mobile node 508 via the received path to establish a route, as indicated by path 536. Once the route is established, the source (mobile node 508) can transmit packets to the destination node (mobile node 518) via the established route. In the event that the source node is not directly or indirectly connected to the backbone, the source node can send MeshRequest packets to its neighbors to activate a mesh, and perform peer-to-peer routing without direction from the backbone service. In the example, shown in FIG. 5, mobile node 510 can establish a mesh to send packets to a destination by sending MeshRequest packets to its neighbor node 512 (as indicated by an arrow 538) instead of sending a RouteRequest packet to backbone 502.

Even when the routes are established to a destination, the backbone service can continue to send gratuitous RouteReply packets to the mobile nodes, in case changes in a channel or network load produce a more optimal path to the destination. In the example shown in FIG. 5, if mobile node 508 moves closer to node 518 and becomes its next-hop neighbor, backbone 502 may send a gratuitous RouteReply packet to node 518, which notifies node 518 that a new least-cost route (node 518 to node 508) is now available. In some embodiments, the backbone service can calculate the changes in metrics as a weighted moving average to avoid sudden or transient changes in a mobile node's local or neighborhood information from causing frequent and unnecessary route updates. This way, the flows adapt to new and/or other optimal routes that remain stable over a period of time (as determined from a sequence of route replies), while ignoring transient optimal routes that remain stable for only a brief time instance.

For multicast traffic, the backbone service sends proactive updates to multicast group members in order to maintain a core-based tree even without any active traffic flows. For each multicast group, the backbone service chooses the most central node in the group, and designates this central node as the core for the multicast group. In some embodiments, the backbone service uses a centrality algorithm to select the core. The core of the group can change, for example, due to mobility among the group members. The backbone service can proactively update all nodes belonging to the multicast group at the time of the update with the best route to the core by sending MulticastRouteReply packets. Mobile nodes, in turn, send MeshActivation packets through the network in order to maintain the multicast tree proactively.

When a mobile node in the group generates multicast traffic, the node can forward the data along the multicast tree. If the mobile nodes do not have connection to the backbone, the mobile nodes revert their routing algorithm back to the MANET multicast routing mechanism, where the source node sends MeshRequest packets to its neighbor nodes.

Figure 6:
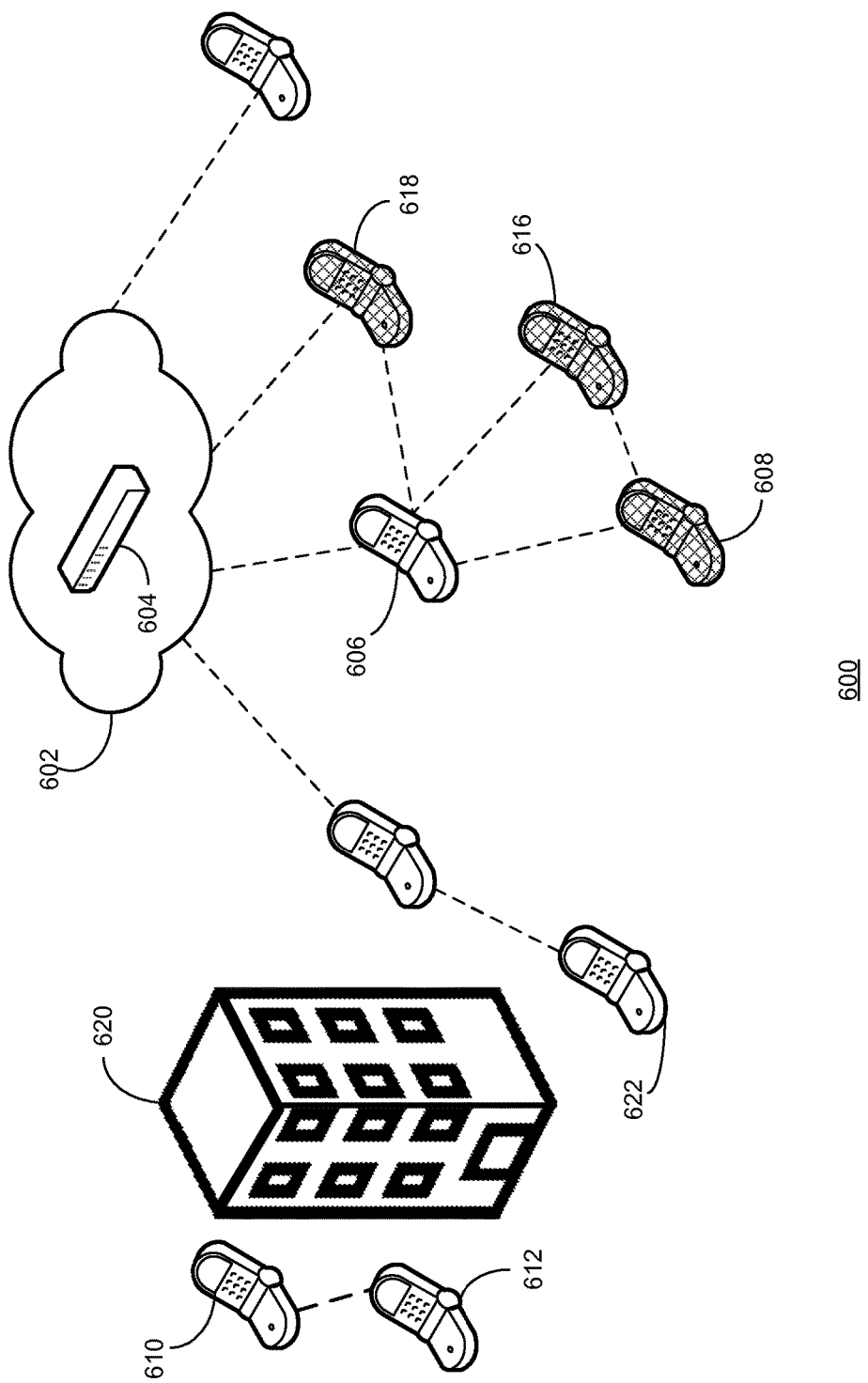
FIG. 6 presents a diagram illustrating an exemplary multicast scenario, in accordance with an embodiment of the present invention.

FIG. 6 presents a diagram illustrating an exemplary multicast scenario, in accordance with an embodiment of the present invention. In FIG. 6, mobile nodes 608, 616, and 618 belong to a multicast group. Mobile node 616 is the core of the group as calculated by backbone 602. During operation, backbone 602 sends MulticastRouteReply packets to members of the multicast group (e.g., mobile nodes 608 and 618) indicating the least-cost path to the core (e.g., node 616). Upon receiving the MulticastRouteReply packets, mobile nodes 608 and 618 send MeshActivation packets periodically to maintain the multicast tree. From FIG. 6, one can see that although mobile node 606 is not a member of the multicast group, node 606 can become a member of the multicast tree, and can forward data packets generated by other members of the tree.

Figure 7A:
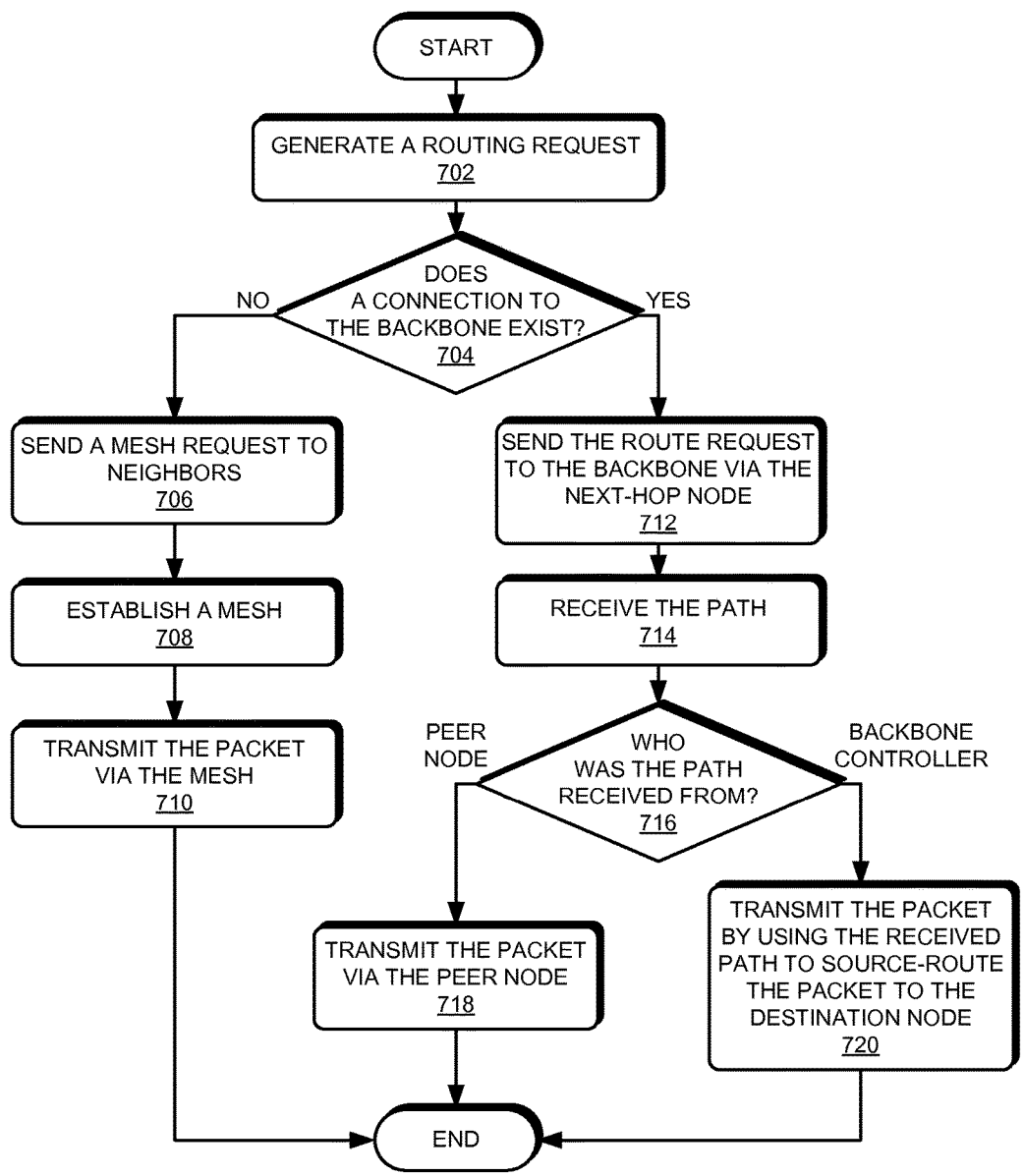
FIG. 7A presents a flowchart illustrating an exemplary routing process performed by a source mobile node, in accordance with an embodiment of the present invention.

FIG. 7A presents a flowchart illustrating an exemplary routing process performed by a source mobile node, in accordance with an embodiment of the present invention. During operation, a mobile network node generates a routing request (operation 702). The node (or the source node) then determines whether it can find a connection (either single-hop or multi-hop) to the backbone (operation 704). In some embodiments, a distance vector routing algorithm is used to find a valid next-hop node. If the node cannot find a connection to the backbone, the node sends a mesh request to its neighbor nodes (operation 706). In some embodiments, the mesh request is flooded up to a horizon threshold. In a further embodiment, the source node may send its first data packet included in the mesh request. The intended receiver establishes a routing mesh spanning the source node and the destination node (operation 708). The established mesh enables transmission of the packet (operation 710). On the other hand, if the source node finds a connection to the backbone by identifying a valid next-hop node, the source node sends a route request packet to the backbone via the identified next-hop node (operation 712). Based on the request, which may identify a destination address or the name of the requested content, the backbone computes a path to the destination. In some embodiments, the backbone uses a weighted graph of the network to find a least-cost path to the destination. The weighted graph can include neighborhood information (such as channel reliability, residual bandwidth, and queueing latency) for each node.

The source node can receive the computed path from the backbone (operation 714). In some embodiments, the computed path is included in a RouteReply packet. The source node then determines which node sends the RouteReply packet that includes the computed path (operation 716). If the path is received from a peer node, the source node transmits packets back to the peer node (operation 718). If the path is received from the backbone, the source node transmits the packet by using the received path to source-route the packet to the destination node (operation 720).

Figure 7B:
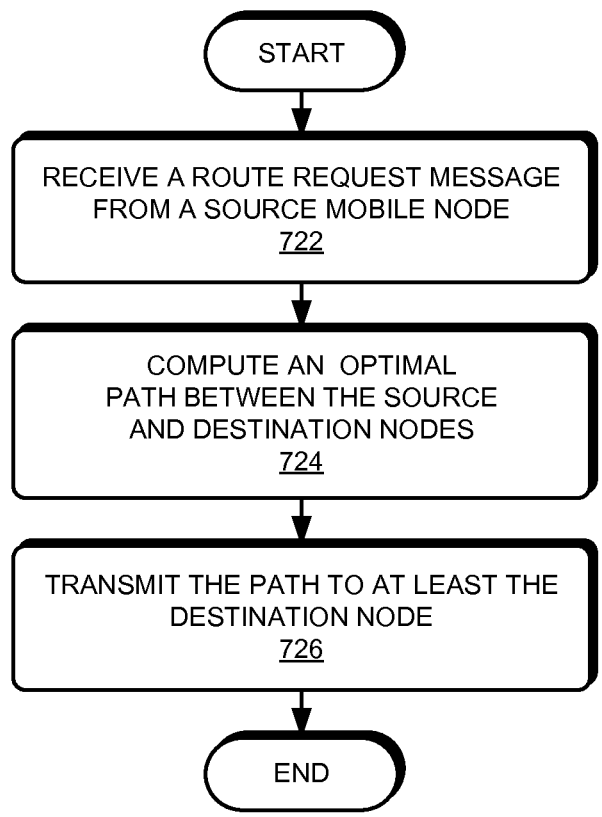
FIG. 7B presents a flowchart illustrating an exemplary routing process performed by a controller node in the backbone, in accordance with an embodiment of the present invention.

FIG. 7B presents a flowchart illustrating an exemplary routing process performed by a controller node in the backbone, in accordance with an embodiment of the present invention. During operation, the controller node receives a route request message from a source mobile node (operation 722), and computes an optimal path between the source node and the destination node (operation 724). In some embodiments, the optimal path is a least-cost path computed based on a weighted network graph. Subsequently, the controller node transmits the path to at least the destination node (operation 726).

Figure 7C:
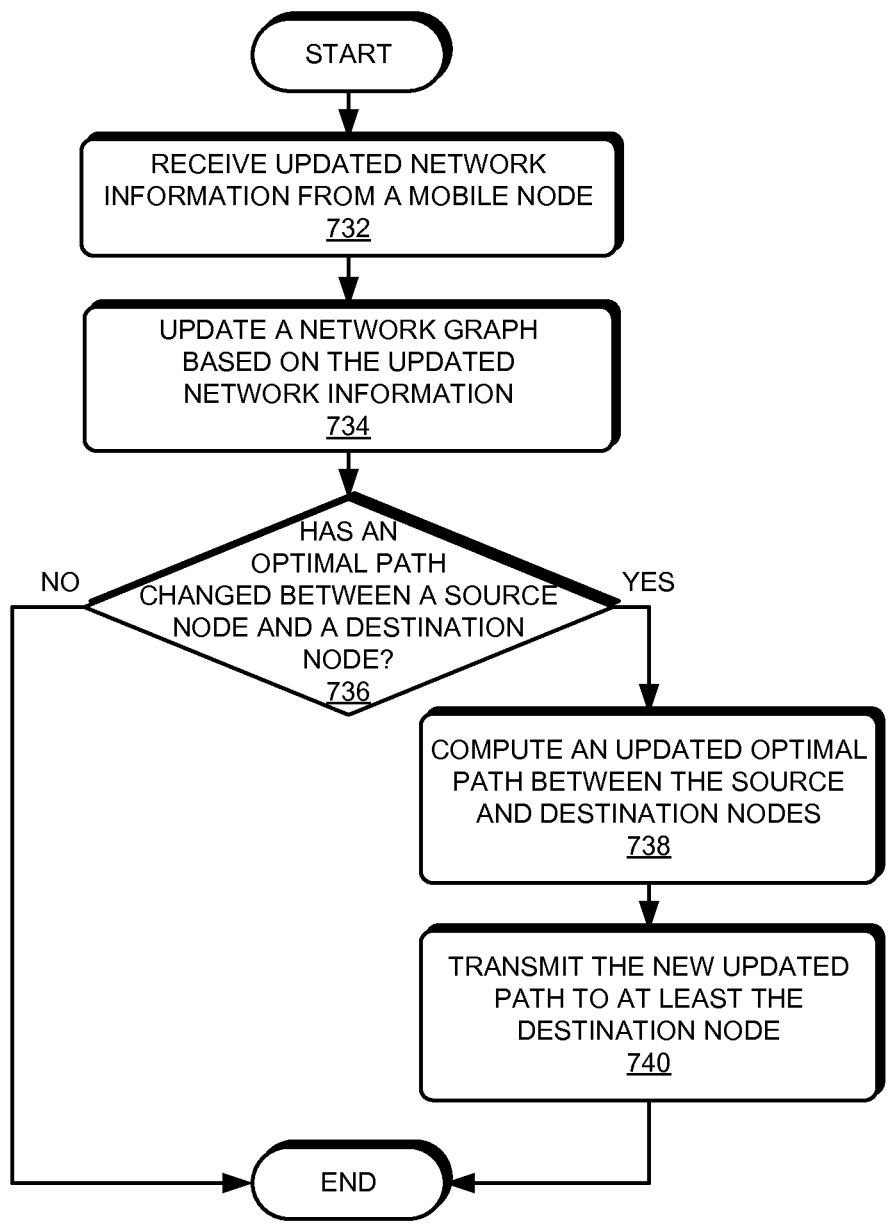
FIG. 7C presents a flowchart illustrating an exemplary route-update process performed by the backbone, in accordance with an embodiment of the present invention.

FIG. 7C presents a flowchart illustrating an exemplary route-update process performed by the backbone, in accordance with an embodiment of the present invention. During operation, the backbone receives updated network information from a mobile node (operation 732), and updates a network graph based on the updated network information (operation 734). The backbone then determines whether an optimal path has been changed between a source node and a destination node based on the updated network graph (operation 736). If so, the backbone computes an updated optimal path between the source node and the destination node (operation 738), and transmits the new updated path to at least the destination node (operation 740).

Note that FIGS. 7A-7C are examples of unicast routing. Multicast routing can be similar where the routing falls back to MANET routing when the source node cannot access the backbone service.

Service-Oriented Routing

In ICN, a node may request a piece of content or a type of service based on the name of the content or service. Upon receiving the "Interest" packet, a content holder can then send a content data packet traversing the path of the "Interest" packet. SDM can also facilitate similar content-based or service-oriented routing. In some embodiments, nodes within an SDM can provide named services, which can include content or computation services. A name in ICN is oftentimes location-independent and uniquely identifies a resource object, such as a content object or a service. A data-forwarding device can use the name or name prefix to forward a packet toward a network node that provides the resource object, regardless of a network address or physical location for the resource object.

In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish among different versions of the content item, such as a collaborative document.

In some embodiments, the name can include a non-hierarchical identifier, such as a hash value that is derived from the content/service object's data (e.g., a checksum value) and/or from elements of the content/service object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated herein by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

In SDM, each node in the network registers its services or content pieces with the backbone. In some embodiments, each node periodically sends BBupdate (backbone update) packets to the backbone. The BBupdate packets can have a format similar to the one shown in FIG. 4. In some embodiments, a node sends a change in the content or service names available in the node to the backbone service to avoid redundant signaling. In some embodiments, some of the nodes may have been pre-populated with certain content pieces or services, and the backbone has been pre-populated with information associated with those content pieces or services. In such scenarios, the nodes do not need to re-register their content or service names with the backbone. However, if the content or service is updated at the node, the node can send updated information to the backbone via BBupdate packets.

A node can request a certain content piece or service by sending a ContentRequest packet to the backbone. Upon receiving the ContentRequest packet, the backbone identifies a group of nodes capable of providing such a content piece or service based on the name, and elects a node within the group with the least-cost path to the requester. In some embodiments, the backbone performs a Dijkstra algorithm to find the node with the lowest-cost path to the requester. Subsequently, the backbone can issue a ContentReply packet to the requester, so that the packet includes the path to the elected node. Upon receiving the ContentReply packet, the requester issues source-routed MeshReply packets to the elected node based on the path indicated in the ContentReply packet in order to establish a route to the elected node. Once the route is established, the elected node can provide the service or content to the requester.

Figure 8:
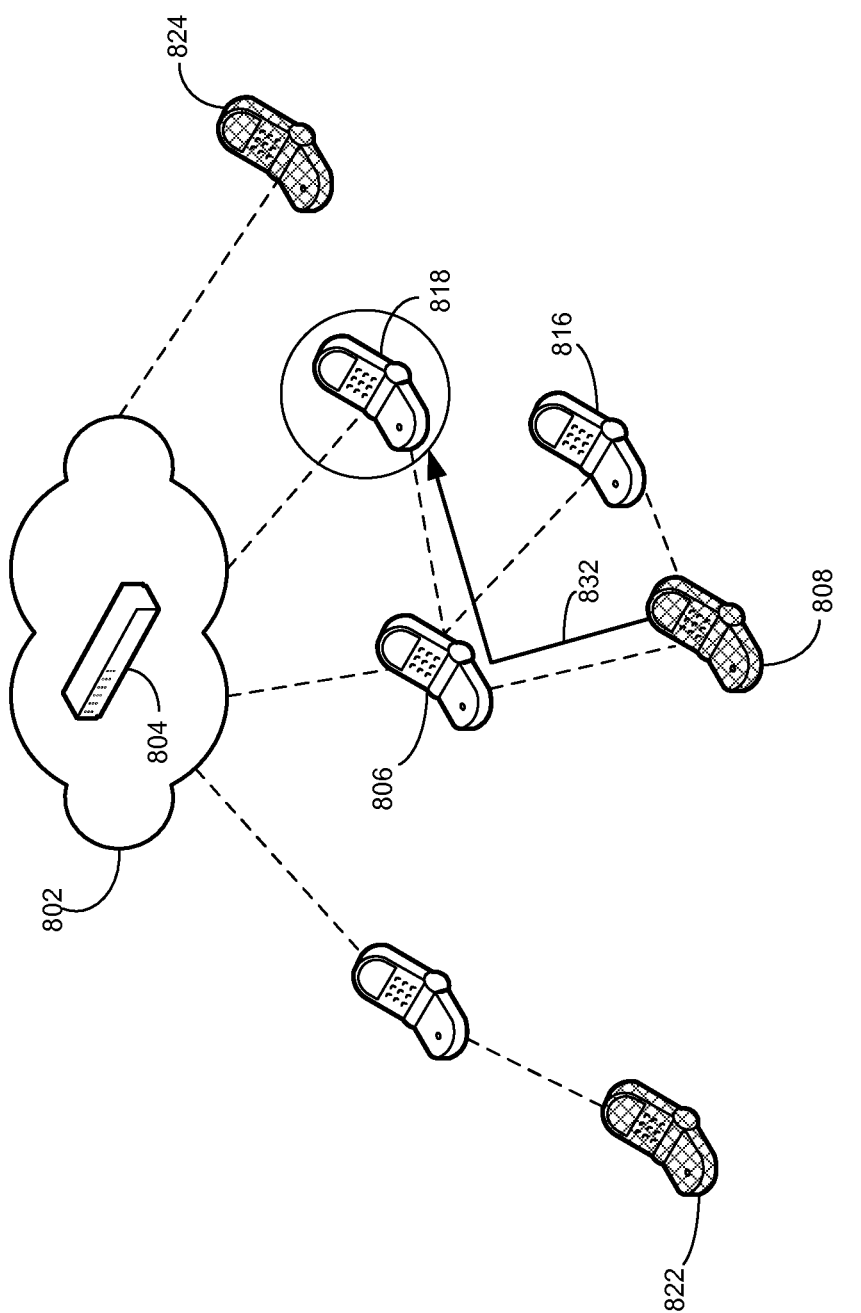
FIG. 8 presents a diagram illustrating an exemplary service-oriented routing scenario, in accordance with an embodiment of the present invention.

FIG. 8 presents a diagram illustrating an exemplary service-oriented routing scenario, in accordance with an embodiment of the present invention. In FIG. 8, mobile node 818 is requesting a service "parc/home/ccn/foo" by sending a ContentRequest packet indicating such a name to a controller node in backbone 802 (e.g., controller node 804). Based on its maintained backbone update records, controller node 804 identifies mobile nodes 822, 824, and 808 are capable of providing the service "parc/home/ccn/foo." In addition, controller node 804 elects node 808 as the closest node for providing such a service, and sends a ContentReply packet to mobile node 818 indicating that node 808 would be able to provide the requested service. Mobile node 818 then sends a source-routed MeshReply packet to node 808 through node 806 in order to establish the route. Once the route is established, node 808 can provide the requested service or transmit the requested content to requester node 818, as indicated by an arrow 832. Alternatively, after electing the closest node 808 to provide the service, controller node 804 may send the ContentReply packet directly to the elected node 808, indicating the requested service and a path to requester node 818. In return, elected node 808 establishes a route with requester node 818 based on the provided path and provides the requested service.

Inter-MANET Routing

The backbone cloud may control multiple MANETs operating on different peer-to-peer channels, and inter-MANET communication can be achieved by activating one or more gateway nodes per MANET. Each gateway node can be configured to communicate with a foreign MANET on a reserved time slot (for TDMA) or airtime (for Wi-Fi).

Figure 9:
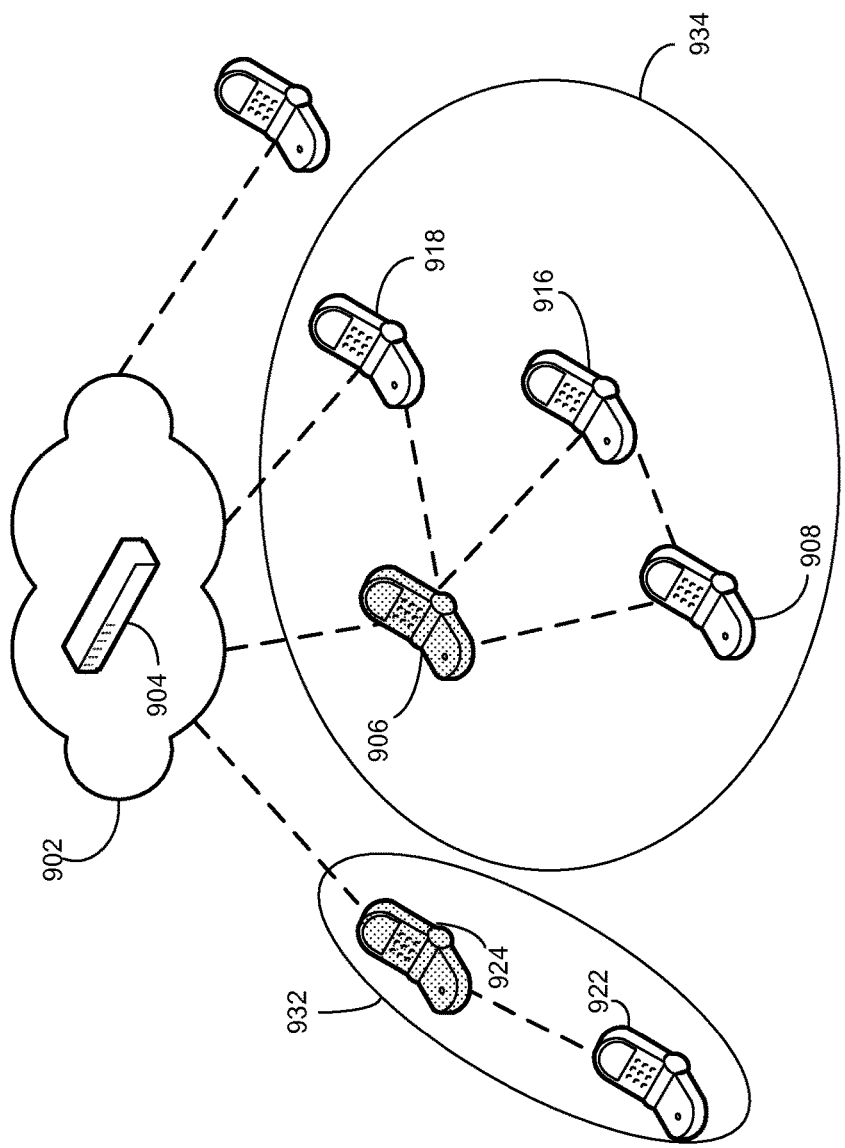
FIG. 9 presents a diagram illustrating an exemplary scenario for inter-MANET communication, in accordance with an embodiment of the present invention.

FIG. 9 presents a diagram illustrating an exemplary scenario for inter-MANET communication, in accordance with an embodiment of the present invention. In FIG. 9, backbone cloud 902 controls multiple MANETs, each operating on a different peer-to-peer channel, such as a MANET 932 and a MANET 934. In some embodiments, the backbone cloud can assign a peer-to-peer channel to a group of nodes based on their geographic locations. The nodes in the group communicate with each other on the assigned peer-to-peer channel, forming a MANET. The term "channel" hereinafter refers to any communication channel. Depending on the transmission protocol, the channel can be a time slot (for TDMA), a frequency channel (for FDMA), or airtime (for Wi-Fi). Each node can send updates to the backbone on a different channel than the peer-to-peer channel.

In the example shown in FIG. 9, MANET 932 includes mobile nodes 922 and 924, and MANET 934 includes mobile nodes 906, 908, 916, and 918. During operation, backbone 902 can assign at least one node in each MANET as a gateway node, and schedules the gateway node in such a way that the gateway node can communicate with nodes in a foreign MANET in order to relay outbound traffic to the foreign MANET.

For example, backbone 902 can activate node 924 within MANET 932 to act as a gateway node, and schedules its transmissions in such a way as to allow node 924 to participate the peer-to-peer communication in MANET 934 over the peer-to-peer channel assigned to MANET 934. For example, backbone 902 can reserve certain time slots on gateway node 924 to ensure that node 924 can communicate with nodes in MANET 934 on those reserved time slots. In the mean time, no one in MANET 932 will communicate with node 924 on those reserved time slots. Similarly, if Wi-Fi is used, gateway node 924 may indicate to its peer node in MANET 932 (node 922) that node 924 is currently sleeping while participating in peer-to-peer communication with nodes in MANET 934.

Backbone 902 can also activate mobile node 906 as a gateway node for MANET 934, and schedules its transmission in such a way as to allow node 906 to participate in the peer-to-peer communication in MANET 932 on certain reserved time slots or airtime. The establishment of the gateway nodes allows nodes in different MANETs to communicate with each other. In addition, exclusively reserving a time slot or airtime for the gateway nodes for inter-MANET communication only enables contention-free inter-MANET routing.

In the example shown in FIG. 9, if node 916 (located within MANET 934) wishes to send a packet to node 922 (located within MANET 932), it will send a route request to backbone 902. While computing an optimal path, backbone 902 notices that these two nodes belong to two different MANETs, and notices that nodes 906 and 924 are gateway nodes for the MANETs. Backbone 902 then computes a network path accordingly. A computed path may include node 916 to node 906, to node 922. Accordingly, node 916 sends the packet to gateway node 906, which forwards the packet to node 922 during a time slot that is reserved for inter-MANET communication. Alternatively, a computed path may include node 916 to node 924, to node 922. Accordingly, node 916 can send the packet to gateway node 924 (if such a data link is available) during a time slot that is reserved for node 924 to communicate with MANET 934. Gateway node 924 then forwards the packet to peer node 922.

Modules and Computer System

Figure 10:
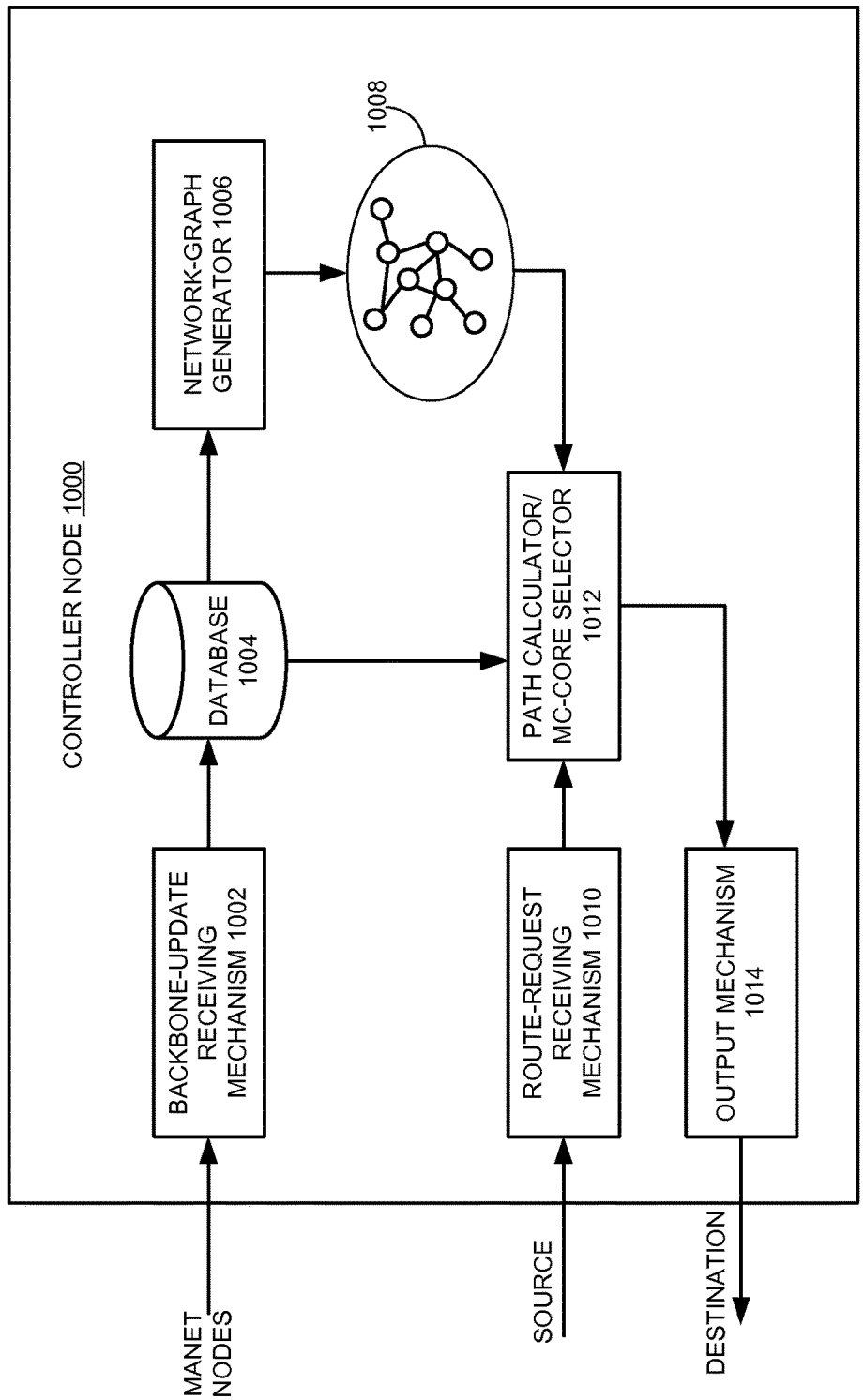
FIG. 10 presents a diagram illustrating an exemplary architecture of a controller node, in accordance with an embodiment of the present invention.

FIG. 10 presents a diagram illustrating an exemplary architecture of a controller node, in accordance with an embodiment of the present invention. Controller node 1000 includes a backbone-update receiving mechanism 1002, a database 1004, a network-graph generator 1006, a network graph 1008, a route-request receiving mechanism 1010, a path calculator/multicast-core selector 1012, and an output mechanism 1014.

Backbone-update receiving mechanism 1002 is responsible for receiving backbone updates from MANET nodes that are associated with the controller node (or other controller nodes within the backbone cloud). In some embodiments, the backbone updates include the neighborhood metrics, a list of multicast groups that a node subscribed to, and content deltas held at each node. The received backbone updates are stored in database 1004. Network-graph generator 1006 is responsible for generating a weighted network graph 1008 based on the received neighborhood metrics. In some embodiments, network-graph generator 1006 dynamically updates the weighted graph based on the received backbone updates.

Route-request receiving mechanism 1010 is responsible for receiving route request from an associated MANET node. The received request is then sent to path calculator/multicast-core selector 1012. For unicast traffic, path calculator 1012 calculates the least-cost path to the destination based on weighted graph 1008. Note that, if the route request includes a name for a piece of content or service, path calculator 1012 first identifies a closest content cache based on information (which can include content-delta updates reported by the mobile nodes) stored in database 1004 and weighted graph 1008, and calculates the least-cost path to that content cache. For multicast traffic, multicast-core selector 1012 selects a multicast core based on weighted graph 1008, and computes a best route to the core for each node within the multicast group. Once the paths are computed, output mechanism 1014 sends the computed paths to the destination node (for unicast traffic) or nodes within the multicast group (for multicast traffic).

Figure 11:
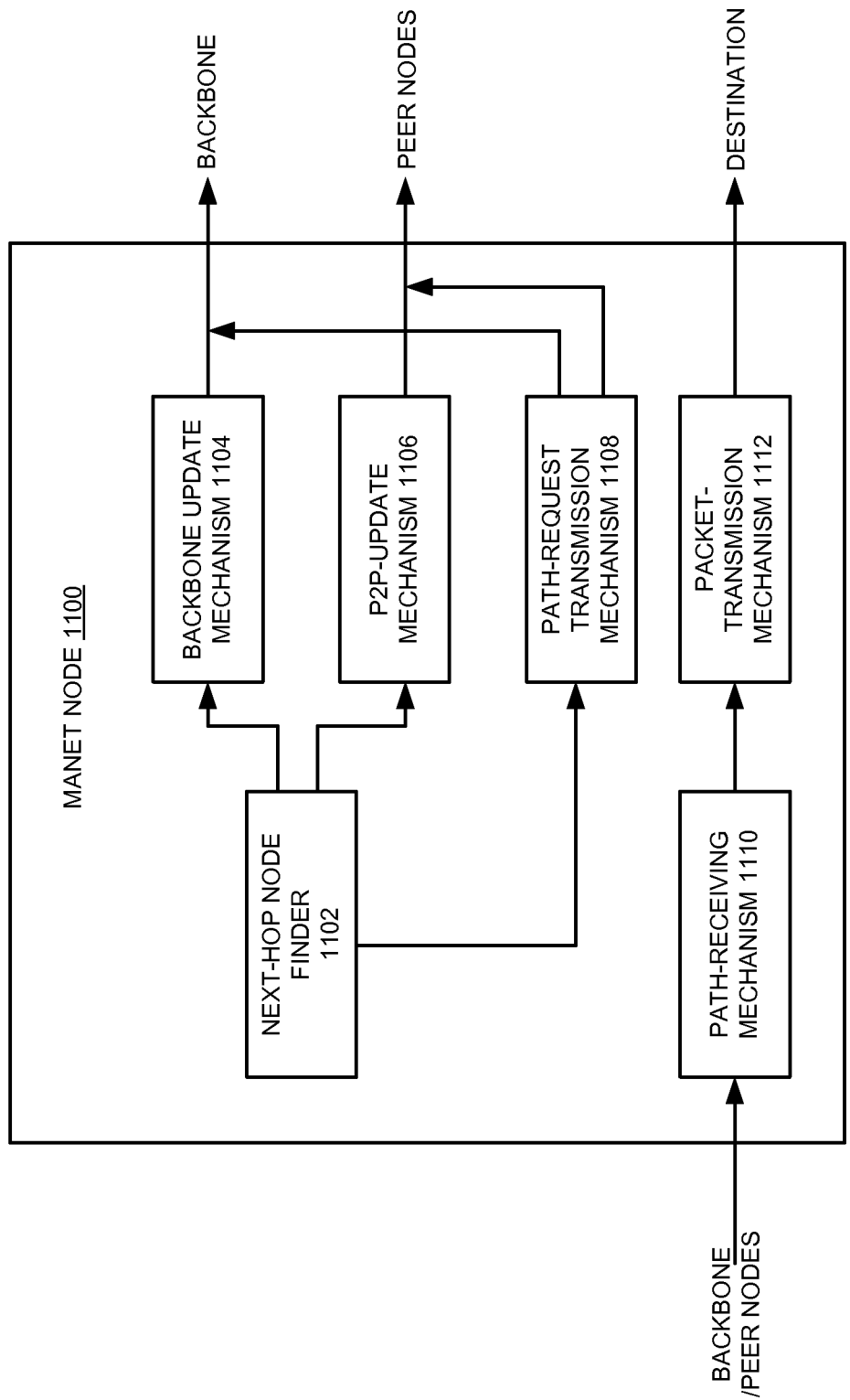
FIG. 11 presents a diagram illustrating an exemplary architecture of a MANET node, in accordance with an embodiment of the present invention.

FIG. 11 presents a diagram illustrating an exemplary architecture of a MANET node, in accordance with an embodiment of the present invention. A MANET node 1100 includes a next-hop finder 1102, a backbone update mechanism 1104, a peer-to-peer update mechanism 1106, a path-request transmission mechanism 1108, a path-receiving mechanism 1110, and a packet-transmission mechanism 1112.

Next-hop finder 1102 is responsible for finding a next-hop node to the backbone. In some embodiments, a distance vector routing algorithm is used by next-hop finder 1102 to find the next-hop node to the backbone. If a next-hop node to the backbone is found, backbone update mechanism 1104 sends backbone updates to the identified next-hop node, which then forwards such updates to the backbone. Otherwise, peer-to-peer-update mechanism 1106 updates various status of MANET node 1100 with other one-hop neighbors.

When MANET node 1100 intends to send a packet to a destination, path-request transmission mechanism 1108 transmits a route-request message to the backbone if a next-hop node to the backbone is available. Otherwise, the route-request is flooded to the peer nodes within a predetermined horizon. Path-receiving mechanism 1110 is responsible for receiving path information, either from the backbone or other peer nodes when the backbone is out of reach. Packet-transmission mechanism 1112 is responsible for transmitting the packet toward the destination based on the received path.

Figure 12:
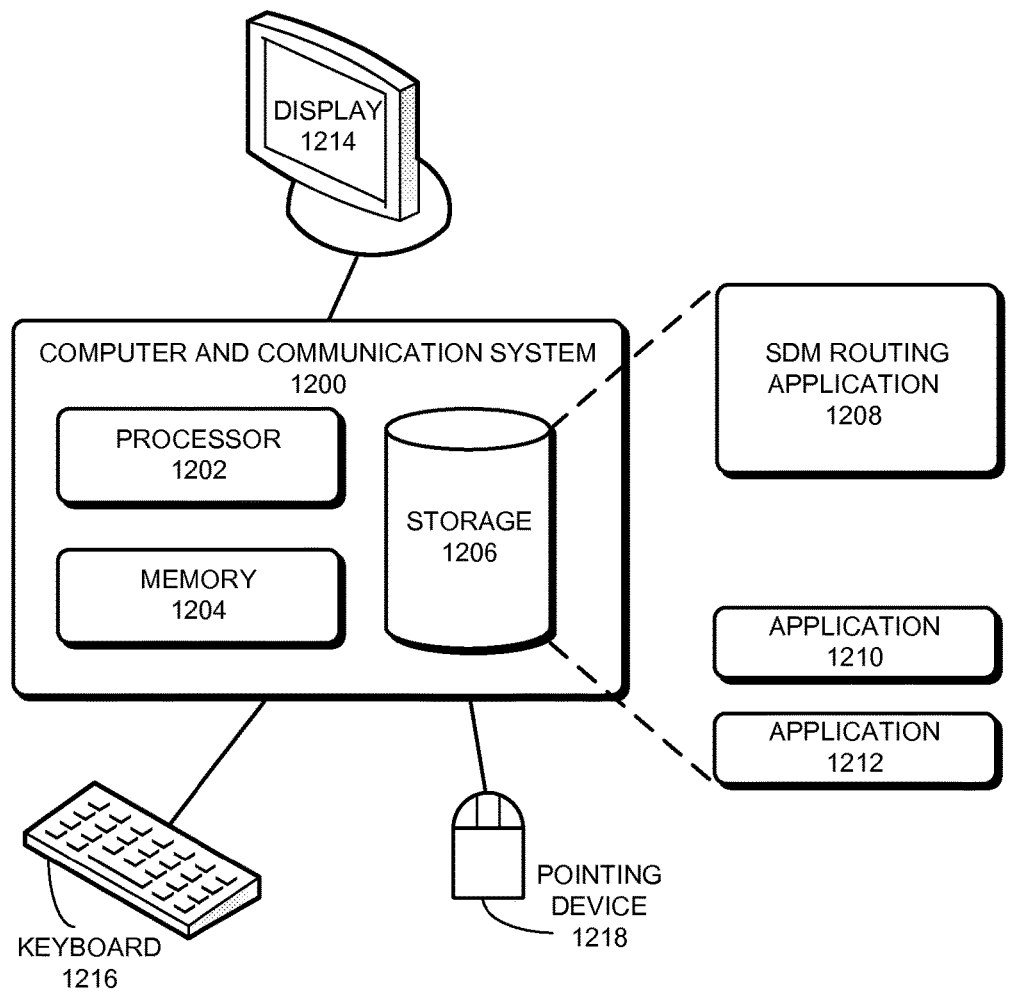
FIG. 12 illustrates an exemplary computer system for routing in software-define MANET (SDM), in accordance with one embodiment of the present invention.

FIG. 12 illustrates an exemplary computer system for routing in software-define MANET (SDM), in accordance with one embodiment of the present invention. In one embodiment, a computer and communication system 1200 includes a processor 1202, a memory 1204, and a storage device 1206. Storage device 1206 stores an SDM routing application 1208, as well as other applications, such as applications 1210 and 1212. During operation, SDM routing application 1208 is loaded from storage device 1206 into memory 1204 and then executed by processor 1202. While executing the program, processor 1202 performs the aforementioned functions. Computer and communication system 1200 is coupled to an optional display 1214, keyboard 1216, and pointing device 1218.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for routing packets in a mobile ad-hoc network, comprising:
    sending, by a local wireless node located in a first mobile ad-hoc network to a centralized controller node that manages a weighted network graph for a plurality of wireless nodes, a route-request message, which includes an interest to a content item;
    receiving, by the local wireless node, a path from the local wireless node to a destination node located in a second mobile ad-hoc network via a gateway node located in the first mobile ad-hoc network and configured to communicate with the second mobile ad-hoc network, the destination node providing the content item, wherein the path is computed by the centralized controller node based on the weighted network graph;
    receiving, by the local wireless node, an updated path to the destination node providing the content via the gateway node and computed by the centralized controller node based on update messages received from the plurality of wireless nodes, wherein the update messages include updates to neighborhood metrics associated with the wireless nodes and updates to content items stored on the wireless nodes, wherein the content items stored on the local wireless node include the content item of the interest; and
    routing, via the gateway node, the interest to the destination node based on the received updated path.

2. The method of claim 1, wherein receiving the path or updated path involves receiving the path or updated path from a next-hop node to the destination node, wherein the path or updated path was transmitted by the centralized controller node via the destination node to establish a route to the local wireless node.

3. The method of claim 1, wherein receiving the path or updated path involves receiving the path or updated path from the centralized controller node, and wherein routing the interest to the destination node involves performing source-route to the destination node based on the received path or updated path.

4. The method of claim 1, wherein sending the route-request message to the centralized controller node involves:
    determining whether the local wireless node has an access to the centralized controller node; and
    in response to the access not existing, sending the route-request message associated with the destination node to a peer network node that has an access to the centralized controller node.

5. The method of claim 1, wherein the neighborhood metrics include a list of neighbor nodes and connectivity metrics for each neighbor node, and wherein the connectivity metrics include one or more of:
    a channel reliability;
    a residual bandwidth; and
    a queueing latency.

6. The method of claim 1, wherein the update messages further include one or more of:
    a list of multicast groups to which the respective wireless node is subscribed; and
    names of resource objects stored by the respective wireless node.

7. A method for routing packets in a mobile ad-hoc network that comprises a plurality of wireless nodes, comprising:
    receiving, by a centralized controller node from a source node located in a first mobile ad-hoc network, a route-request message, which includes an interest to a content item;
    computing a path between the source node and a destination node located in a second mobile ad-hoc network via a gateway node located in the first mobile ad-hoc network and configured to communicate with the second mobile ad-hoc network, the destination node providing the content item based on a weighted network graph for the mobile ad-hoc network;
    receiving update messages from the plurality of wireless nodes, wherein a respective update message received from a wireless node includes an update to neighborhood metrics associated with the wireless node and an update to content items stored on the wireless node, wherein the content items stored on the local wireless node include the content item of the interest;
    updating the weighted network graph based on the received updated messages;
    computing an updated path to the destination node providing the content item via the gateway node based on the updated weighted network graph; and
    transmitting the updated path to the destination node.

8. The method of claim 7, wherein updating the weighted network graph involves computing a cost function for each link within the mobile ad-hoc network based on the neighborhood metrics.

9. The method of claim 7, further comprising:
    selecting a multicast core for a multicast group based on the weighted network graph; and
    computing best routes to the multicast core for each node within the multicast group.

10. The method of claim 7, further comprising:
    scheduling transmissions of the gateway node to enable the gateway node to communicate with nodes within the second mobile ad-hoc network operating at a different wireless channel,
    wherein scheduling the transmissions of the gateway node involves reserving one or more transmission opportunities for the gateway node to communicate with the second mobile ad-hoc network.

11. A non-transitory computer-readable storage medium storing instructions that when executed by a computing device cause the computing device to perform a method for routing packets in a mobile ad-hoc network, the method comprising:
receiving, by a centralized controller node from a source node located in a first mobile ad-hoc network, a route-request message, which includes an interest to a piece of content;
computing a path between the source node and a destination node located in a second mobile ad-hoc network via a gateway node located in the first mobile ad-hoc network and configured to communicate with the second mobile ad-hoc network, the destination node providing the content item based on a weighted network graph for the mobile ad-hoc network;
receiving update messages from the plurality of wireless nodes, wherein a respective update message received from a wireless node includes an update to neighborhood metrics associated with the wireless node and an update to content items stored on the wireless node, wherein the content items stored on the local wireless node include the content item of the interest;
updating the weighted network graph based on the received update messages;
computing an updated path to the destination node providing the content item via the gateway node based on the updated weighted network graph; and
transmitting the updated path to the destination node.

12. The non-transitory computer-readable storage medium of claim 11, wherein updating the weighted network graph involves computing a cost function for each link within the mobile as-hoc network based on the neighborhood metrics.

13. The non-transitory computer-readable storage medium of claim 11, wherein the method further comprises:
selecting a multicast core for a multicast group based on the weighted network graph; and
computing best routes to the multicast core for each node within the multicast group.

14. The non-transitory computer-readable storage medium of claim 11, wherein the method further comprises:
scheduling transmissions of the gateway node to enable the gateway node to communicate with nodes within the second mobile ad-hoc network operating at a different wireless channel,
wherein scheduling the transmissions of the gateway node involves reserving one or more transmission opportunities for the gateway node to communicate with the second mobile ad-hoc network.

15. A mobile ad-hoc network (MANET), comprising:
a centralized controller node that manages a weighted network graph for a plurality of wireless nodes; and
a plurality of mobile nodes, wherein a respective mobile node located in a first mobile ad-hoc network comprises:
a processor;
a storage device coupled to the processor and storing instructions which when executed by the processor cause the processor to perform a method, the method comprising:
sending, to the centralized controller node, a route-request message, which includes an interest to a content item;
receiving a path from the respective mobile node to a destination node located in a second mobile ad-hoc network via a gateway node located in the first mobile ad-hoc network and configured to communicate with the second mobile ad-hoc network, the destination node providing the content item, wherein the path is computed by the centralized controller node based on the weighted network graph;
receiving, by the respective mobile node, an updated path to the destination node providing the content item via the gateway node and computed by the centralized controller node based on update messages received from the plurality of mobile nodes, wherein the update messages include updates to neighborhood metrics associated with the mobile nodes and updates to content items stored on the mobile nodes, wherein the content items stored on the local wireless node include the content item of the interest; and
routing, via the gateway node, the interest to the destination node based on the received updated path.

16. The MANET of claim 15, wherein receiving the path or updated path involves receiving the path or updated path from a next-hop node to the destination node, wherein the path or updated path was transmitted by the centralized controller node via the destination node to establish a route to the respective mobile node.

17. The MANET of claim 15, wherein receiving the path or updated path involves receiving the path or updated path from the centralized controller node, and wherein routing the interest to the destination node involves performing source-route to the destination node based on the received path or updated path.

18. The MANET of claim 15, wherein while sending the route-request message to the centralized controller node, the request-sending mechanism is further configured to:
determine whether the mobile node has an access to the centralized controller node; and
in response to the access not existing, send the route-request message associated with the destination node to a peer network node that has an access to the centralized controller node.

19. The MANET of claim 15 wherein the neighborhood metrics include a list of neighbor nodes and connectivity metrics for each neighbor node, and wherein the connectivity metrics include one or more of:
a channel reliability;
a residual bandwidth; and
a queueing latency.

20. The MANET of claim 15, wherein the updated messages further include one or more of:
a list of multicast groups to which the local wireless node is subscribed; and
names of resource objects stored by the local wireless node.

* * * * *